US012482300B2

(12) United States Patent
Tekeian et al.

(10) Patent No.: US 12,482,300 B2
(45) Date of Patent: Nov. 25, 2025

(54) SYSTEMS AND METHODS FOR COLLECTING AND ANALYZING ADDITIVE FABRICATION PROCESS RESULTS OF AN ADDITIVE FABRICATION DEVICE

(71) Applicant: Formlabs, Inc., Somerville, MA (US)

(72) Inventors: Edward Tekeian, Cambridge, MA (US); Benjamin FrantzDale, Harvard, MA (US); Jacob A. Misra, Somerville, MA (US); Kyle P. McNulty, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 157 days.

(21) Appl. No.: 18/394,144

(22) Filed: Dec. 22, 2023

(65) Prior Publication Data

US 2024/0212395 A1   Jun. 27, 2024

Related U.S. Application Data

(60) Provisional application No. 63/435,041, filed on Dec. 23, 2022.

(51) Int. Cl.
*G07C 3/14* (2006.01)
*B29C 64/386* (2017.01)
*B33Y 50/00* (2015.01)

(52) U.S. Cl.
CPC ............ *G07C 3/146* (2013.01); *B29C 64/386* (2017.08); *B33Y 50/00* (2014.12)

(58) Field of Classification Search
CPC ........ G07C 3/146; B29C 64/386; B33Y 50/00
See application file for complete search history.

(56) References Cited

U.S. PATENT DOCUMENTS

2016/0179064 A1* 6/2016 Arthur .................. G05B 15/02
                                                                700/98
2020/0133234 A1* 4/2020 Theirl ..................... G06F 3/122

FOREIGN PATENT DOCUMENTS

CN           115239645 A * 10/2022 ............. B33Y 50/00

* cited by examiner

*Primary Examiner* — Curtis A Kuntz
*Assistant Examiner* — James E Munion

(57) ABSTRACT

Techniques are described to gather information from an end user relating to fabrication process failures in a standardized manner. This information may be provided to an additive fabrication device manufacturer and analyzed by the manufacturer. Analysis may include identifying patterns in the data to identity problems relating to an additive fabrication device, software used to operate the device and/or user operations. Identification of such patterns may aid in selecting and/or generating support solutions to be provided the end user, or to improve the additive fabrication device and/or software.

16 Claims, 8 Drawing Sheets

SYSTEMS AND METHODS FOR COLLECTING AND ANALYZING ADDITIVE FABRICATION PROCESS RESULTS OF AN ADDITIVE FABRICATION DEVICE

CROSS-REFERENCE TO RELATED APPLICATIONS

The present application claims the benefit under 35 U.S.C. § 119(e) of U.S. Provisional Patent Application No. 63/435,041, filed Dec. 23, 2022, titled "Systems and Methods for Collecting and Analyzing Print Failures of an Additive Fabrication Device," which is hereby incorporated by reference in its entirety.

FIELD OF INVENTION

The present invention relates generally to systems and methods for collecting, analyzing, and providing support in response to additive fabrication process failures of an additive fabrication device.

BACKGROUND

Additive fabrication, e.g., 3-dimensional (3D) printing, provides techniques for fabricating objects, typically by causing portions of building material to solidify at specific positions. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering, or combinations thereof. Many additive fabrication techniques build parts by forming successive layers, which are typically cross-sections of the desired object. Typically, each layer is formed such that it adheres to either a previously formed layer or a build surface upon which the object is built.

In one approach to additive fabrication, known as stereolithography (SLA) or inverted stereolithography, solid objects are created by successively forming thin layers of a curable photopolymer, typically first onto a build surface and then one on top of another. Exposure to actinic radiation cures a thin layer of liquid photopolymer, which causes it to harden and adhere to previously cured layers and/or to a print substrate (i.e., film layer).

In another approach, known as selective laser sintering (SLS), solid objects are created by successively forming thin layers by selectively fusing together powdered material.

SUMMARY

In some aspects, the techniques described herein relate to a method of reporting additive fabrication process failures of an additive fabrication device, including: receiving a print task to produce a 3D model provided by a user; in response to completing the print task and thereby producing a printed 3D model, displaying a first graphical user interface to the user, wherein the first graphical user interface includes a first option for indicating an additive fabrication process failure, and a second option for indicating a print success; in response to receiving a response corresponding to the first option, displaying a second graphical user interface to the user, wherein the second graphical user interface includes captured images of the printed 3D model or functionalities to capture images of the printed 3D model, and functionalities for providing additive fabrication process failure information; and in response to receiving the user providing the additive fabrication process failure information, sending the additive fabrication process failure information to a remote server.

In some aspects, the techniques described herein relate to an additive fabrication device including a computer and a display, the computer configured to: receive a print task to produce a 3D model provided by a user; in response to completing the print task and thereby producing a printed 3D model, cause to display a first graphical user interface to the user on the display, wherein the first graphical user interface includes a first option for indicating an additive fabrication process failure, and a second option for indicating a print success; in response to receiving a response corresponding to the first option, cause to display a second graphical user interface to the user, wherein the second graphical user interface includes captured images of the printed 3D model or functionalities to capture images of the printed 3D model, and functionalities for providing additive fabrication process failure information; and in response to receiving the user providing the additive fabrication process failure information, send the additive fabrication process failure information to a remote server.

In some aspects, the techniques described herein relate to a non-transitory computer readable medium storing instructions that, when executed by at least one processor, cause an additive fabrication device to: receive a print task to produce a 3D model provided by a user; in response to completing the print task, cause to display a first graphical user interface to the user, wherein the first graphical user interface includes a first option for indicating an additive fabrication process failure, and a second option for indicating a print success; in response to receiving a response corresponding to the first option, cause to display a second graphical user interface to the user, wherein the second graphical user interface includes captured images of the printed 3D model or functionalities to capture images of the printed 3D model, and functionalities for providing additive fabrication process failure information; and in response to receiving the user providing the additive fabrication process failure information, send the additive fabrication process failure information to a remote server.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and examples will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
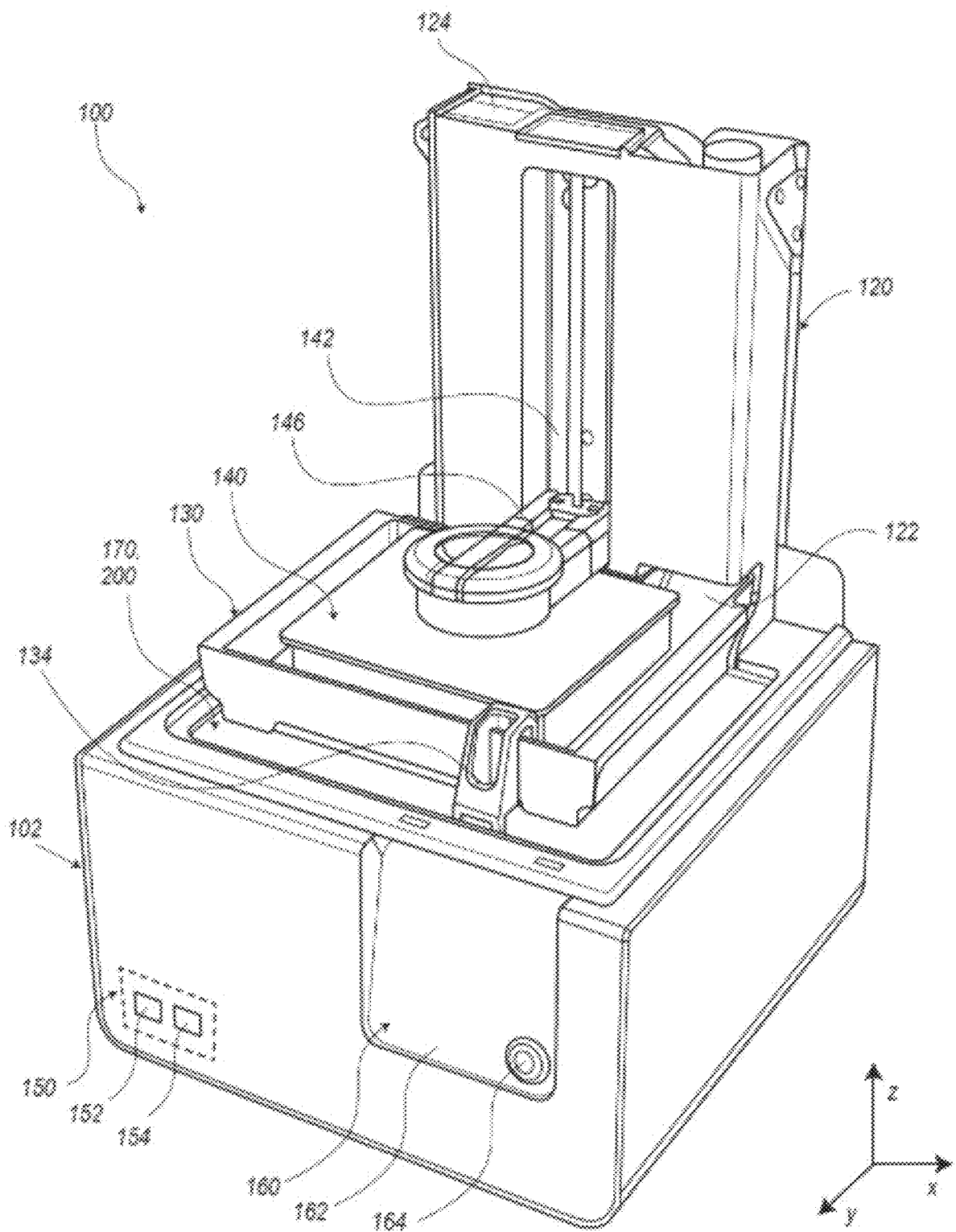
FIG. 1A shows a perspective view of an example additive fabrication system, where the system is arranged in an initial configuration, according to some embodiments.

During an additive fabrication process, fabrication quality may be affected by factors relating to the additive fabrication device (e.g., device age, challenging object geometries and/or device design defects), and/or environmental factors (e.g., temperature changes during fabrication and/or source material degradation). Ideally, additive fabrication device manufacturers and service teams would collect information related to additive fabrication process failures to better understand the underlying issues. However, it is conventionally difficult for a manufacturer or support team to collect such information in a manner that is effective for analysis. For instance, while an end user may voluntarily contact the support team through phone calls or emails, the time and effort required for reporting often prevents end users from doing so for. In addition, customer phone calls and emails provide information that cannot generally be easily analyzed due to varying ways in which the information is gathered by different users. For instance, the information may be presented in different formats and as a result it may be difficult or impossible hard to successfully analyze the information and identify patterns of fabrication behavior. Therefore, a standardized process for reporting additive fabrication process failures, and analyzing the resulting information, is beneficial to both additive fabrication device manufacturers and end users.

The inventors have recognized and appreciated techniques to gather information from an end user relating to fabrication process failures in a standardized manner. This information may be provided to an additive fabrication device manufacturer and analyzed by the manufacturer. Analysis may include identifying patterns in the data to identity problems relating to an additive fabrication device, software used to operate the device and/or user operations. Identification of such patterns may aid in selecting and/or generating support solutions to be provided the end user, or to improve the additive fabrication device and/or software.

As one example of analysis of information provided via the techniques described herein, if the additive fabrication device manufacturer receives information describing the same type of additive fabrication process failure from different instances of the same device operating at different locations, this may indicate a problem relating to the device. On the other hand, if a type of additive fabrication process failure only occurs at a specific site for a specific customer, the issue may be identified as related to the environment, procedure and/or operator at that site.

Following below are more detailed descriptions of various concepts related to, and implementations of, techniques to gather information from an end user relating to fabrication process failures in a standardized manner. It should be appreciated that various aspects described herein may be implemented in any of numerous ways. Examples of specific implementations are provided herein for illustrative purposes only. In addition, the various aspects described in the implementations below may be used alone or in any combination and are not limited to the combinations explicitly described herein.

Figure 1B:
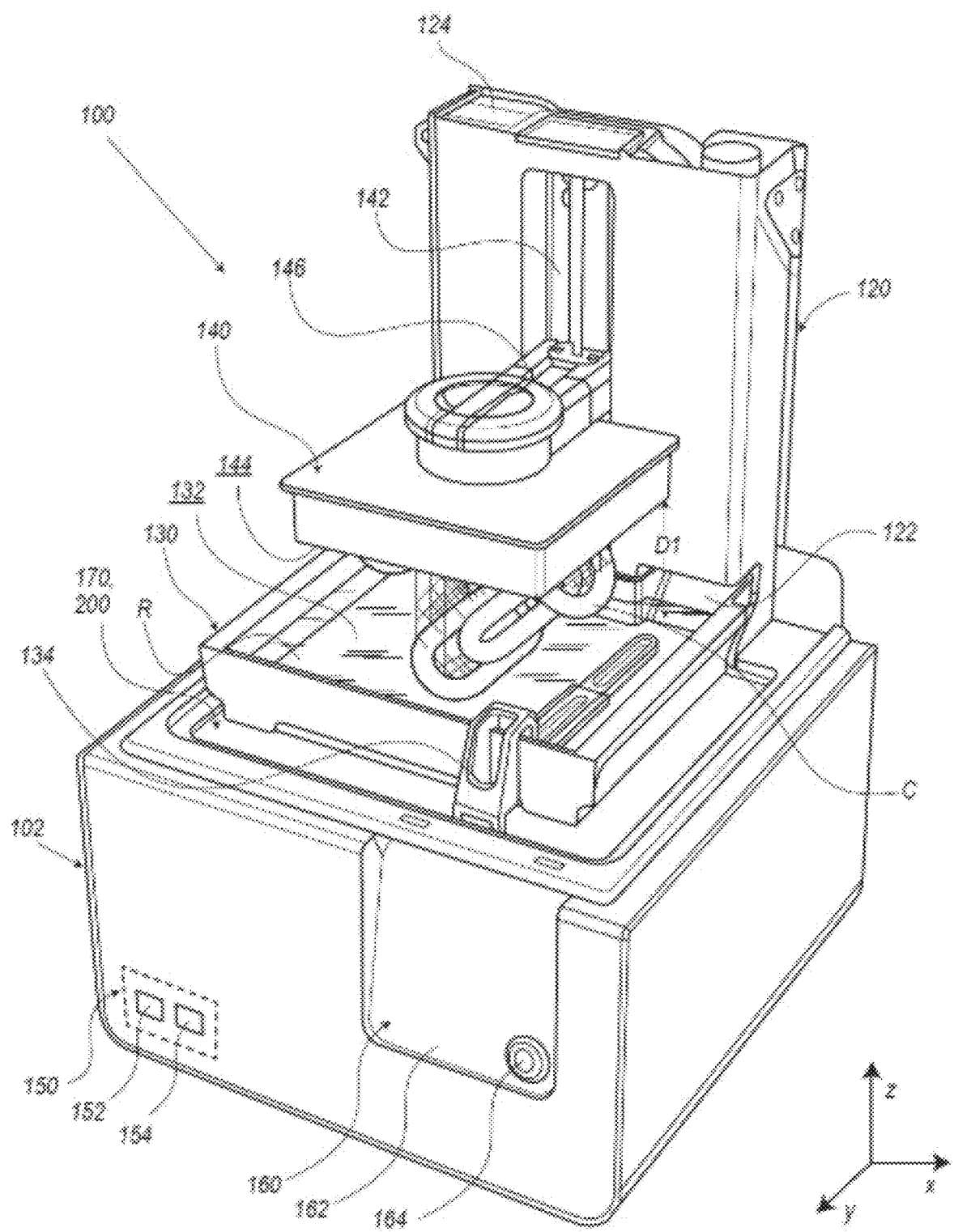
FIG. 1B shows a perspective view of an example additive fabrication system, where the system is arranged in a fabricating configuration, according to some embodiments.
Figure 1C:
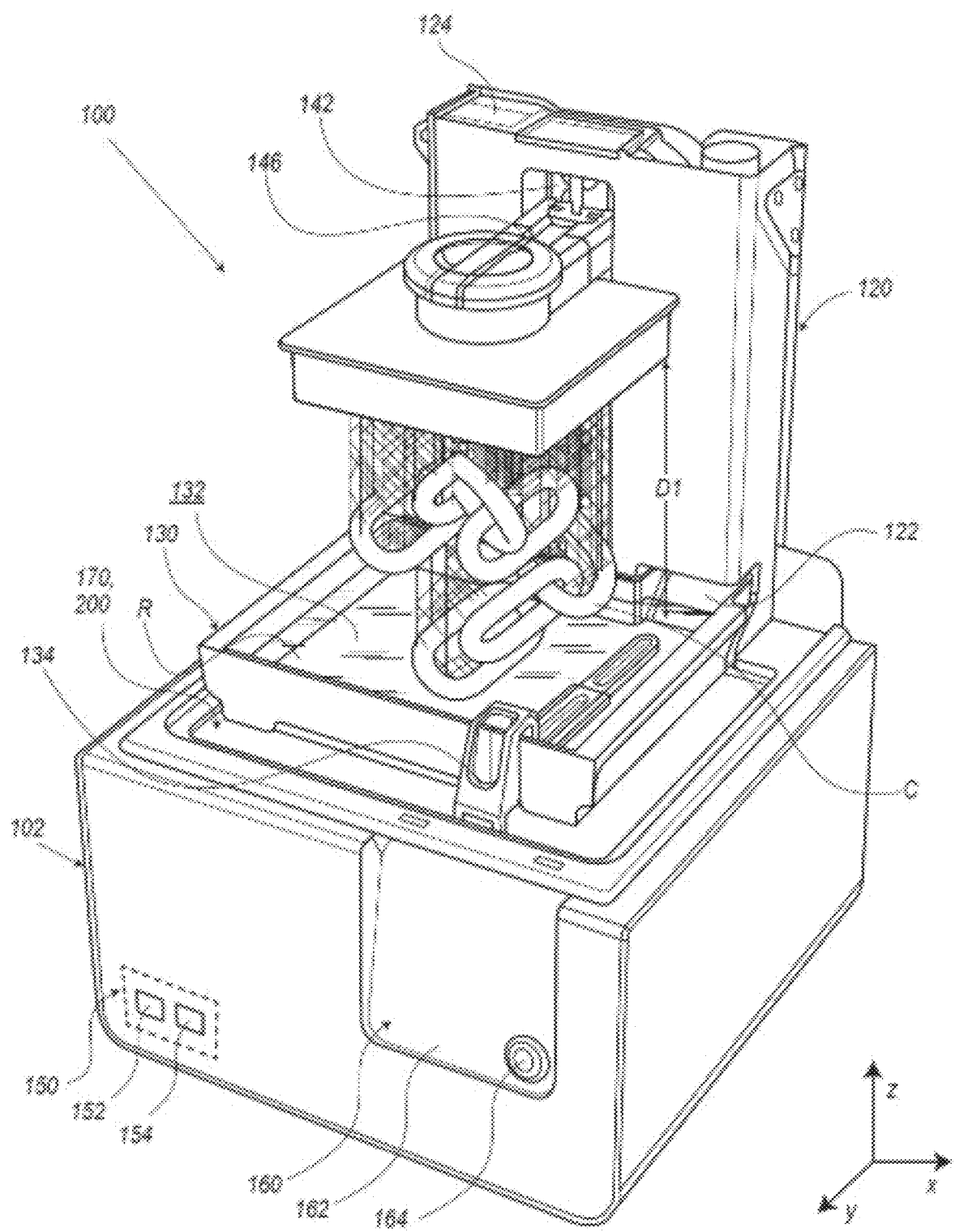
FIG. 1C shows a perspective view of an example additive fabrication system, where the system is arranged in a finished configuration, according to some embodiments.

Referring to FIGS. 1A-1C, an additive fabrication device 100, such as a stereolithographic printer, includes a base 110 and a dispensing system 120 coupled to the base 110. The base 110 supports a fluid basin 130 configured to receive a liquid photopolymer (hereinafter referred to for illustrative purposes as a "resin", although it will be appreciated that a liquid photopolymer need not be limited to resins) from the dispensing system 120. The additive fabrication device 100 further includes a build platform 140 positioned above the fluid basin 130 and operable to traverse a vertical axis (e.g., z-axis) between an initial position (FIG. 1A) adjacent to a bottom surface 132 of the fluid basin 130 and a finished position (FIG. 1C) spaced apart from the bottom surface 132 of the fluid basin 130.

The base 110 of the additive fabrication device 100 may house various mechanical, optical, electrical, and electronic components operable to fabricate objects using the device. In the illustrated example, the base 110 includes a computing system 150 including data processing hardware 152 and memory hardware 154. The data processing hardware 152 is configured to execute instructions stored in the memory hardware 154 to perform computing tasks related to activities (e.g., movement and/or printing based activities) for the additive fabrication device 100. Generally speaking, the computing system 150 refers to one or more locations of data processing hardware 152 and/or memory hardware 154. For example, the computing system 150 may be located locally on the additive fabrication device 100 or as part of a remote system (e.g., a remote computer/server or a cloud-based environment).

The base 110 may further include a control panel 160 connected to the computing system 150. The control panel 160 includes a display 162 configured to display operational information associated with the additive fabrication device 100 and may further include an input device 164, such as a keypad or selection button, for receiving commands from a user. In some examples, the display is a touch-sensitive display providing a graphical user interface configured to receive the user commands from the user in addition to, or in lieu of, the input device 164.

The base 110 houses a curing system 170 configured to transmit actinic radiation into the fluid basin 130 to incrementally cure layers of the photopolymer resin contained within the fluid basin 130. The curing system 170 may include a projector or other radiation source configure to emit light at a wavelength suitable to cure the photopolymer resin within the basin. Thus, different light sources may be selected depending on the desired photopolymer resin to be used for fabricating a component C. In the present disclosure, the curing system 170 includes a liquid crystal panel 200 for curing the photopolymer resin within the fluid basin 130.

As shown, the fluid basin 130 is disposed atop the base 110 adjacent to the curing system 170 and is configured to receive a supply of the resin R from the dispensing system 120. The dispensing system 120 may include an internal reservoir 124 providing an enclosed space for storing the resin until the resin is needed in the fluid basin 130. The dispensing system 120 further includes a dispensing nozzle 122 in communication with the fluid basin 130 to selectively supply the resin R from the internal reservoir 124 to the fluid basin 130.

The build platform 140 may be movable along a vertical track or rail 142 (oriented along the z-axis direction, as shown in FIGS. 1A-1C) such that base-facing build surface 144 of the build platform 140 is positionable at a target distance DI along the z-axis from the bottom surface 132 of the fluid basin 130. The target distance DI may be selected based on a desired thickness of a layer of solid material to be produced on the build surface 144 of the build platform 140 or onto a previously formed layer of the object being fabricated. In some implementations, the build platform 140 is removable from the additive fabrication device 100. For instance, the build platform 140 may be attached to the rail 142 by an arm 146 (e.g., pressure fit or fastened onto) and may be selectively removed from the additive fabrication device 100 so that a fabricated component C attached to the build surface 144 can be removed via the techniques described above.

In the example of FIGS. 1A-1C, the bottom surface 132 of basin 130 may be transparent to actinic radiation that is generated by the curing system 170 located within the base 110, such that liquid photopolymer resin located between the bottom surface 132 of the basin 130 and the build surface 144 of the build platform 140 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the build surface 144 of the build platform 140 or to a bottom surface of an object being fabricated thereon.

Following the curing of a layer of the fabrication material, the build platform 140 may incrementally advance upward along the rail 142 in order to reposition the build platform 140 for the formation of a new layer and/or to impose separation forces upon any bond with the bottom surface 132 of basin 130. In addition, the basin 130 is mounted onto the support base such that the additive fabrication device 100 may move the basin 130 along a horizontal axis of motion (e.g., x-axis), the motion thereby advantageously introducing additional separation forces in at least some cases. A wiper 134 is additionally provided, capable of motion along the horizontal axis of motion and which may be removably or otherwise mounted onto the base 110 or the fluid basin 130.

With continued reference to FIGS. 1A-1C, the additive fabrication device 100 is shown at different stages of the fabrication process. For example, at FIG. 1A, the additive fabrication device is shown in an initial state prior to dispensing the resin R into the basin 130 from the reservoir 124 of the dispensing system 120. Upon receipt of fabrication instructions, the additive fabrication device 100 positions the build surface 144 of the build platform 140 at an initial distance DI from the bottom surface 132 of the basin 130 corresponding to a thickness of the first layer of resin R to be cured. The curing system 170 then emits an actinic radiation profile (i.e., an image) corresponding to the profile of the current layer of the component C to cure the current layer. Upon curing of the current layer, the build platform 140 incrementally advances upward to the next build position. The distance of each advancement increment corresponds to a thickness of the next layer to be fabricated. The curing system 170 then projects the profile of the component layer corresponding to the new position. The new component layer is cured on a bottom surface of the previous component layer. The curing and advancing steps repeat until the build platform 140 reaches the final position (FIG. 1C) corresponding to the finished component C.

Figure 2A:
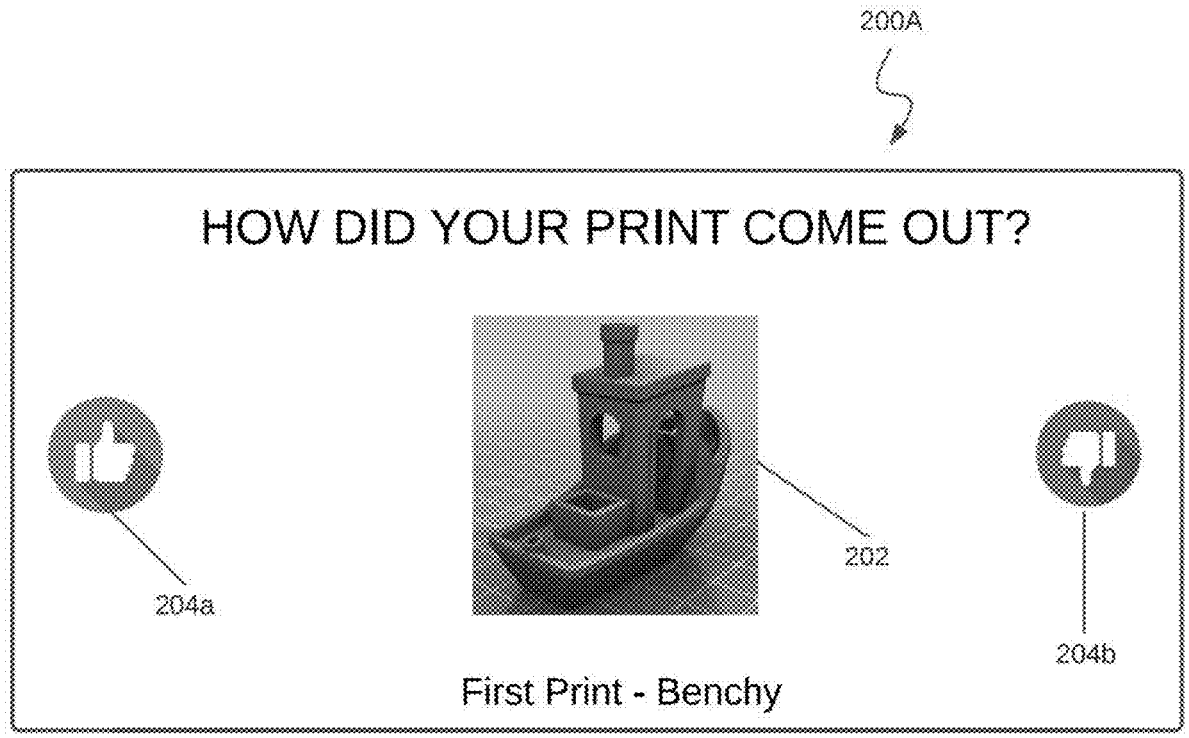
FIG. 2A shows an example graphical user interface for reporting the print quality of an additively fabricated object, according to some embodiments.

FIG. 2A shows an example graphical user interface 200A for reporting the print quality of a 3D printed object. In some embodiments, the graphical user interface 200A is displayed on a display of the additive fabrication device (e.g., display 162 of FIG. 1A) and accessible to an operator of the additive fabrication device. The graphical user interface 200A includes a display of an image or a 3D model of the printed object 202, and a first control 204a for indicating a successful print and a second control 204b for indicating a failed print. For example, the first and the second controls can be a pair of icons of thumbs-up and thumbs-down, checks and crosses, smiley faces and sad faces, etc. In some embodiments, the graphical user interface 200A is displayed on a touch-display and the operator of the additive fabrication device can directly press on the first control 204a or the second control 204b. Alternatively, the additive fabrication device operator can use one of many input devices (e.g., keypads, mouse, knobs, etc.) to select the first control 204a or the second control 204b.

Alternatively, or additionally, the first graphical user interface may appear on a mobile device of the additive fabrication device operator. For example, the additive fabrication device operator may have previously installed an additive fabrication device related application on a smartphone. The additive fabrication device has wireless connectivity and pushes a notification along with the first graphical user interface 200A to the smartphone of the additive fabrication device operator. In such a case, captured images or video of the printed object (e.g., by cameras installed inside the additive fabrication device) will be displayed. A benefit of having the first graphical user interface 200A displayed on the user's mobile device rather than the additive fabrication device itself is that the additive fabrication device operator is no longer required to come to the additive fabrication device for operation.

In response to the additive fabrication device operator selecting the second control indicating a failed print, additional graphical user interfaces will appear, either on the additive fabrication device or on the operator's mobile device, guiding the operator to collect additive fabrication process failure information, as explained in FIGS. 2B and 3A-3C.

Figure 2B:
FIG. 2B shows an example graphical user interface for providing additional feedback on additive fabrication process failures of an additively fabricated object, according to some embodiments.

FIG. 2B shows an example graphical user interface 200B for providing additional feedback on additive fabrication process failures of an additively fabricated object. For example, FIG. 2B may appear on the additive fabrication device (e.g., display 162) in response to the operator selecting the second control 204b in FIG. 2A, displayed on the additive fabrication device.

In some embodiments, the graphical user interface 200B includes a machine-readable optical label 206 such as a QR code or a bar code for the user to scan with a mobile device with camera.

In response to the user scanning the optical label 206 with a mobile device, additional graphical user interfaces will appear on the user's mobile device to further guide the additive fabrication device operator to report the additive fabrication process failure information.

Note that in some workflow, graphical user interface 200B is not present as the image of the failed print and the further instructions may be directly sent to the user's mobile device.

Figures 3A, 3B, 3C:
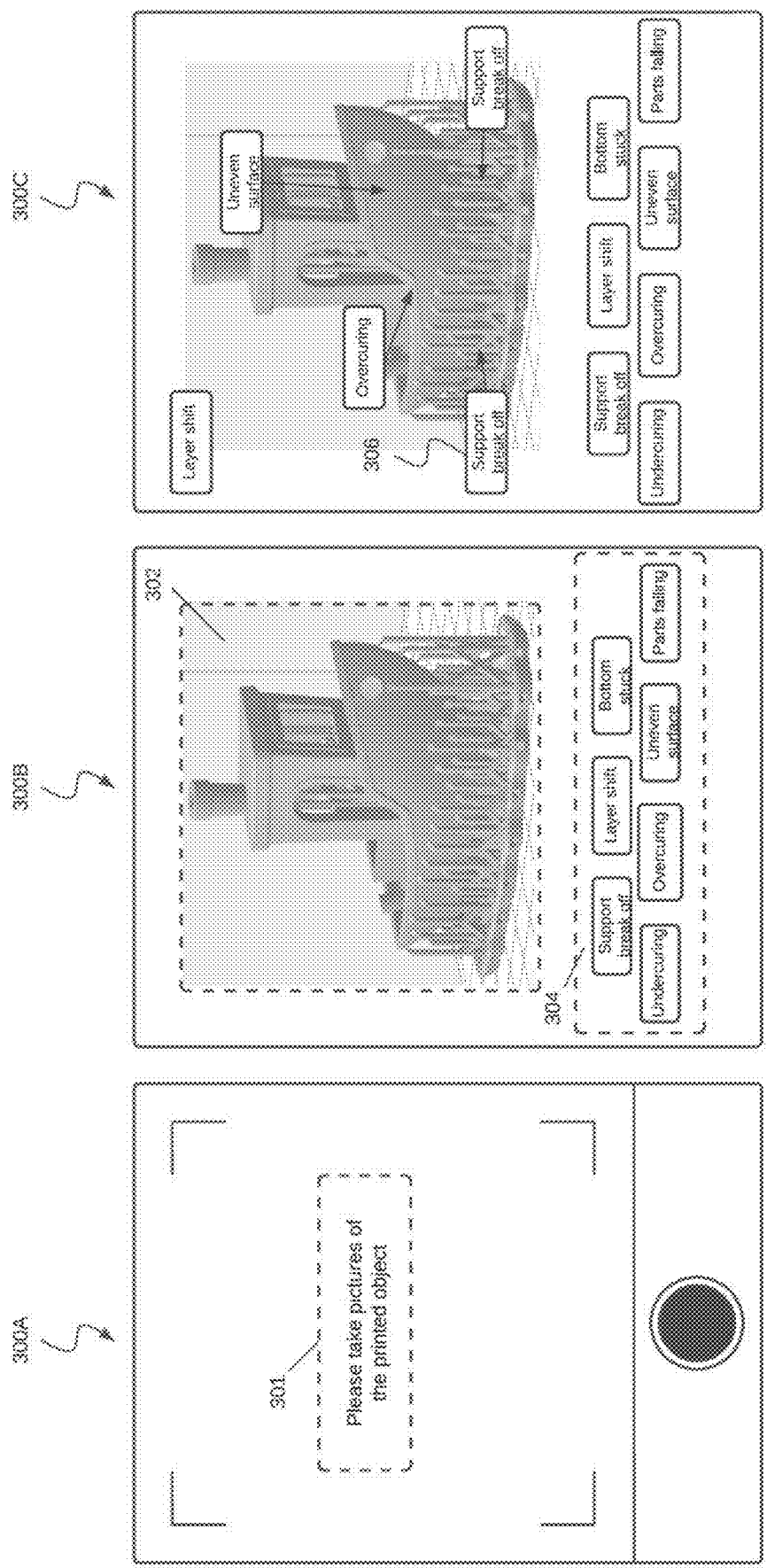
FIGS. 3A-3C show example graphical user interfaces for annotating images representing additive fabrication process failures of an additively fabricated object, according to some embodiments.

FIGS. 3A-3C show example graphical user interfaces 300A-300C for annotating images representing additive fabrication process failures of an additively fabricated object.

For example, graphical user interface 300A may appear on a mobile device of the additive fabrication device operator in response to the additive fabrication device operator scanning the optical label 206 as shown in FIG. 2B. The graphical user interface 300A represents an image capture application configured to capture images of the failed print for further processing. In some examples, one or more user prompts 301 are displayed on the graphical user interface 300A to guide the mobile device user to capture images of the failed print. For example, the prompts 301 may ask the user to take images from different angles of the failed print, may ask the user to remove the failed print from the build platform before taking images, may ask the user to move closer or farther away from the print, etc.

Once the user captures images or videos of the failed print, the graphical user interface 300B appears for the user to report additional information of the failed print. In some examples, the graphical user interface 300B displays the captures images 302 of the failed print, and a plurality of tags 304 representing short description of the additive fabrication process failure. Exemplary tags may include: "Support break off," "layer shift," "bottom stuck," "undercuring," "overcuring," "uneven surface," "parts failing," etc.

In some embodiments, the plurality of tags 304 can be replaced to overlay the print image 302, to indicate specific locations where the described failures occurred. For example, as shown in FIG. 3C, a few tags have been placed to locations on the failed print to indicate the areas that such failures occur. The tag "support break off" indicates areas on the print (e.g., optionally indicated by an arrow) where supports defects have occurred.

In some embodiments, one or more tags may be used to indicate a global level failure description, rather than a location-specific failure. For example, the print may have shifted layers globally, and the "layer shift" tag can be placed to indicate that this is a global issue.

Once the user finished labeling the additive fabrication process failures, the user can confirm and choose to send the labeled images to the manufacturer or support team. In some examples, the user can choose to schedule a support meeting after submitting the additive fabrication process failure information.

With the received information, the manufacturer and support team can quickly categorize the additive fabrication process failure and send additional support information. For example, if the failure can be quickly fixed by changing one or more settings of the additive fabrication device, the support team can directly send instructions back to the user (e.g., displayed on the user's mobile device or the additive fabrication device directly). In other cases, when the failures are more complicated, the support team can automatically schedule a follow-up call or visit with the additive fabrication device operator.

Figure 4:
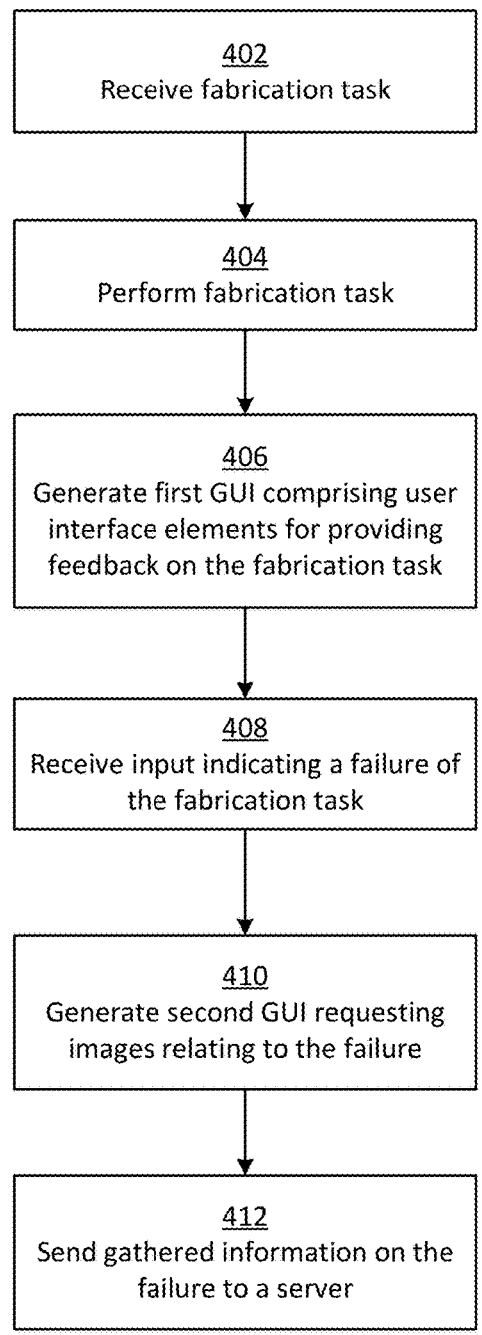
FIG. 4 shows an example flowchart of a process for reporting additive fabrication process failure information of an additively fabricated object, according to some embodiments.

FIG. 4 shows an example flowchart of a process 400 for reporting additive fabrication process failure information of an additively fabricated object. For example, the process 400 may be implemented using graphical user interfaces and workflow as described in FIGS. 2A-2B, 3A-3C. For convenience, the process 400 will be described from the perspective of a computer, such as a computer implemented on an additive fabrication device (e.g., an SLA additive fabrication device, an SLS additive fabrication device, a Fused Filament Fabrication (FFF) additive fabrication device, a binder-jet additive fabrication device, or any other kinds of additive fabrication devices).

In act 402, the computer onboard the additive fabrication device receives a fabrication task (also referred to herein as a print task) to produce a 3D model provided by a user (402). For example, the user can use any additive fabrication device control software, such as PreForm® by Formlabs, to communicate the print task to the additive fabrication device.

Subsequently, the 3D printer performs and completes the print task (404) as instructed. During this process, one or more defects may have been produced in one or more fabricated parts ("prints") produced during the print task. For example, a print may have failed because a bottom layer breaks off the build platform, or parts of the print may have been under-cured or over-cured, leaving structural defects. As explained above in this disclosure, conventionally, accurately and efficiently reporting these defects is a challenge for the end user. However, with a programmed UI flow as illustrated in FIGS. 2A-2B, 3A-3C, it is easy for the end user to provide the defect information to the additive fabrication device manufacturer or a support team, as explained below.

After the print finishes, a first graphical user interface (e.g., the graphical user interface 200A illustrated in FIG. 2A) is displayed on the additive fabrication device (e.g., on a display screen 162 of the additive fabrication device). The first graphical user interface includes a first option (e.g., the control 204b of FIG. 2A) for indicating an additive fabrication process failure (e.g., a thumbs-down affordance), and a second option (e.g., the control 204a of FIG. 2A) for indicating a print success (e.g., a thumbs-up affordance) (406). In some embodiments, the first and the second controls are displayed on a touch-sensitive display of the additive fabrication device, and the user can tap the respective icon for selecting the options. Alternatively, or additionally, the additive fabrication device includes controls (e.g., keypads, joysticks, mouse, etc.) for selecting the first or the second options.

In some embodiments, instead of displaying the first graphical user interface (GUI) on the additive fabrication device's display, the computer may instead send a notification to a mobile device of the user. For example, the user may have previously installed an application associated with the additive fabrication device on the mobile device, and as the print task finishes, a notification will appear on the application. As the user opens the application, the first graphical user interface appears on the mobile device of the user. The user can then select the first or the second options on the first graphical user interface displayed on their mobile device.

In response to the user selecting the first option on first graphical user interface, indicating an additive fabrication process failure (408), the display of the additive fabrication device shows a second graphical user interface (e.g., graphical user interface 300B of FIG. 3B) (410). The second graphical user interface includes one or more captures images of the failed print. For example, the printer may have internal cameras that automatically capture images of the print when the print task finishes. In addition, the graphical user interface 300B includes functionalities for assigning reasons for additive fabrication process failure to the captured images (e.g., the tags 304). Alternatively, or additionally, the images of the printed 3D object are displayed on the mobile device of the user (e.g., through the installed application), rather than on the additive fabrication device.

In some alternative embodiments, instead of directly displaying the second graphical user interface in response to the user selecting the first option indicating a failed print, the display of the additive fabrication device and the mobile device of the user display a few intermediate graphical user interfaces for guiding the user to capture images of the failed print using a camera installed on the mobile device.

For example, in response to the user selecting the first option on the display of the additive fabrication device, a third graphical user interface (e.g., the graphical user interface 200B of FIG. 2B) displays an optical label (e.g., the optical label 206 of FIG. 2B). The optical label encodes information for guiding the user to capture images of the failed print.

For example, the user may open a camera application of their mobile device to scan the optical label, and in response to the scanning, a fourth graphical user interface (e.g., the graphical user interface 300A) of FIG. 3A appears on the user's mobile device. The fourth graphical user interface includes an image-capturing function and prompts (e.g., prompt 301) for guiding the user to take a set of images capturing defects of the failed print.

After the user captures images of the failed print, the first graphical user interface 300B appears with the captured images (the image 302 of FIG. 3B) and functionalities for assigning additional information on the image to indicate the reason for additive fabrication process failure (e.g., the tags 304).

In some embodiments, a group of the tags may indicate global reasons for additive fabrication process failures, such as "print dimensional inaccuracies", "small features not sharp", "additive fabrication device not level", etc. In some embodiments, another group of tags may indicate regional reasons for additive fabrication process failures, for example, one region of the surface may have experienced "over-curing" or "under-curing", or a region may have "supports break-off". For the regional reason tags, the user can move them to the specific regions of the image to indicate areas where such problems occurred, as shown in FIG. 3B.

With a combination of tags indicating regional print issues, and tags indicating global issues, the user can annotate the images of the printed object to quickly identify types of defects of the print.

In some embodiments, other inputs methods for annotating the images to describe additive fabrication process failures are provided. For example, the second graphical user interface may include input methods such as dialog boxes for the user to describe the defects using words, or voice recording functions for the user to record a speech describing the problem. As mentioned above, the second graphical user interface may appear on both the display of the additive fabrication device or on the mobile device of the user and is configured to use any input methods supported by the respective devices.

Once the defects have been identified, the additive fabrication device's computer (or the user's mobile device) will send the additive fabrication process failure information to a server of the manufacturer or the support team (412).

According to some embodiments, additive fabrication process failure information may comprise any one or more of the following: one or more images captured of one or more prints (e.g., as described above in act 410), tags produced by the user indicating print issues along with data describing a position on the one or more images that are associated with each tag, one or more 3D geometrical models (e.g., STL files, CAD models) of the one or more prints produced by the additive fabrication process, and/or data describing the print job. Additionally, or alternatively, additive fabrication process failure information may include data describing the orientation of each part during the print process, the 3D volume of each part, the number of parts in the print job, the materials used to print the parts, and input parameters utilized by the software that generated the print job to generate supports for printing the parts, and/or a version of the software that generated the print job.

Once the additive fabrication process failure information is received by the server of the manufacturer or support team in act 412, the server and/or other computational resources available to the manufacturer or support team (hereinafter, "manufacturer's computing device") may analyze the additive fabrication process failure information to determine one or more steps to be taken in response. In some embodiments, analysis by the manufacturer's computing device may comprise identifying one or more causes of the print failure based on the additive fabrication process failure information and sending, to the user's device (e.g., mobile device, the printer) one or more suggested modifications to the print job to increase chances of a successful print job with the same parts. Such analysis may be performed by a machine learning classifier that has been trained on a training set of additive fabrication process failure information (e.g., images, tags, print job data, etc.) with known failure causes.

According to some embodiments, the one or more steps determined by the manufacturer's computing device in response to receiving the additive fabrication process failure information may include providing documentation (or a link or other shortcut to documentation) to the user's device that provides guidance on how to address the observed print failure.

According to some embodiments, the one or more steps determined in response to receiving the additive fabrication process failure information may include automatically adjusting the print job to address the observed print failure. For instance, the additive fabrication process failure information may comprise a user file that describes the configuration of the print job (e.g., 3D models to be fabricated in the print job along with their orientation, position, support structures, etc.). The manufacturer's computing device may modify this user file and recompute the print job after making one or more changes to the configuration of the print job. In some embodiments, recomputing the print job may comprise regenerating a support structure in the initial print job configuration after modifying the orientation of a part that is supported by that support structure. Modification of the user file may be performed, for example, by accessing an API of the software used to generate the print job by the user, where the computing device selects a version of the API to match the version of the software used to generate the print job provided as part of the additive fabrication process failure information.

Figure 5:
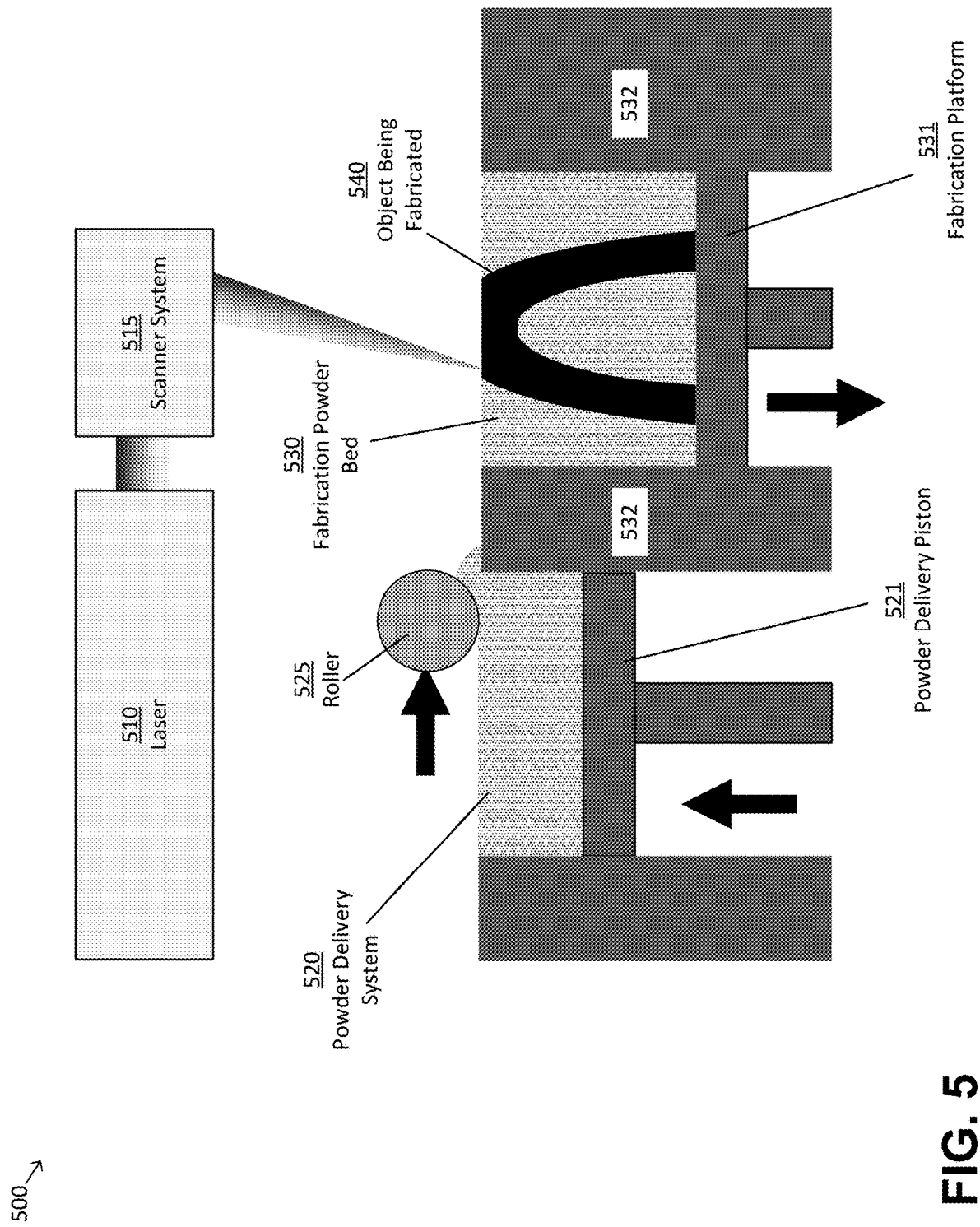
FIG. 5 depicts an illustrative conventional SLS additive fabrication device.

The above-mentioned process can also be implemented on a selective laser sintering (SLS) device. An illustrative conventional SLS additive fabrication device is illustrated in FIG. 5. In the example of FIG. 5, SLS device 500 comprises a laser 510 paired with a computer-controlled scanner system 515 disposed to operatively aim the laser 510 at the fabrication bed 530 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In some embodiments, the first graphical user interface and the second graphical user interface are displayed on different devices. For example, the first graphical user interface may be displayed on a touchscreen of an additive fabrication device, and the second graphical user interface may be displayed on a mobile device of the user (e.g., a hand-held device such as a smart phone, a tablet, or a camera device).

In some embodiments, prior to displaying the second graphical user interface, the computer displays a third graphical user interface that includes an optical label such as a bar code or a QR code, and in response to the user scanning the optical label with the mobile device, the mobile device displays the second graphical user interface.

In some embodiments, the second graphical user interface includes instructions for capturing images and/or video of the failed print for analysis. For example, the user may be asked to manually provide input for analyzing the prints. Alternatively, the computer may use any of the machine learning methods to automatically analyze the prints and generate additive fabrication process failure reports.

In some embodiments, the optical label includes information about the printed 3D model such as the identity, resin type, layer height, and the number of layers in the print. Alternatively, the information about the printed 3D model can be directly downloaded to the mobile device or the server for analysis. In some examples, the optical label also includes information about the additive fabrication device that produces the printed model.

In some embodiments, prior to displaying the second graphical user interface, the computer sends a notification to an application installed on the user's mobile device. In response to the user opening the application, the application displays the second graphical user interface on the mobile device.

In some embodiments, prior to displaying the second graphical user interface, the computer sends a text, email, or a short code to the user's mobile device. In response to the user opening the text, email, or the short code, the mobile device displays the second graphical user interface on the mobile device.

In some embodiments, the user is asked to manually provide additive fabrication process failure information. The functionalities for providing additive fabrication process failure information includes an annotation function that allows the user to annotate the captured images.

In some embodiments, annotating the captured images includes assigning one or more metadata tags to the entire captured images to describe types of the additive fabrication process failure. Examples of annotation tags include "Support tip detached," "Part fell off supports," "Layer detached," "Surface roughness," "Surface defect," and "Part detached and stuck to tank".

In some embodiments, annotating the captured images includes assigning one or more metadata tags to the specific locations on the captured images to describe types of the additive fabrication process failure at the specific locations.

In some embodiments, alerting customer support service of the additive fabrication device, and/or displaying information of support articles to the user. For example, alerting customer service agents when a new failure mode has emerged. Agents can then review and potentially correct/ recategorize failures and contact the user Based on (a), automatically provide support articles to the user to prevent future failures Automatically update print success statistics Automatically flag emerging print success trends to customer service Automatically flag a customer service agent to contact the user for more details.

In some embodiments, the first graphical user interface (e.g., thumb-up or thumb-down) and the second graphical user interface (e.g., annotating interface) are displayed on a hand-held device. (E.g., allow the remote person to add notes to the site-local job queue, so an operator can know what to do with a thumbs-down print. In some embodiment, a technician is running a print-farm but someone else is really the operator and that other person is the right person to assess failures. The additive fabrication device could provide the "selfie" of the part and all the scoring of the print could be done remotely; the tech would just see it was thumbs-down, throw out the part (or do whatever was asked of them), and clean it up.)

In some embodiments, providing failure information further includes using computer vision-based failure detection system for analyzing types of additive fabrication process failures.

In some embodiments, the functionalities for providing additive fabrication process failure information includes a function that allows the user to provide voice memos or other voice-based inputs.

In the example of FIG. 5, the material in the fabrication bed 530 is selectively heated by the laser in a manner that causes the powder material particles to fuse (sometimes also referred to as "sintering" or "consolidating") such that a new layer of the object 540 is formed. SLS is suitable for use with many different powdered materials, including any of various forms of powdered nylon. Once a layer has been successfully formed, the fabrication platform 531 may be lowered a predetermined distance by a motion system (not pictured in FIG. 5). Once the fabrication platform 531 has been lowered, the material deposition mechanism 525 may be moved across a powder delivery system 520 and onto the fabrication bed 530, spreading a fresh layer of material across the fabrication bed 530 to be consolidated as described above. Mechanisms configured to apply a consistent layer of material onto the fabrication bed may include the use of wipers, rollers, blades, and/or other levelling mechanisms for moving material from a source of fresh material to a target location. Additional powder may be supplied from the powder delivery system 520 by moving the powder delivery piston 521 upwards. In some cases, areas around the fabrication bed (e.g., the walls 532, the platform 531, etc.) may include heating elements to heat the powder in the fabrication bed. Such heaters may be used to preheat unconsolidated material, as discussed above, prior to consolidation via the laser.

Once a layer has been successfully formed, the fabrication platform 531 may be lowered a predetermined distance by a motion system (not pictured in FIG. 5). Once the fabrication platform 531 has been lowered, the recoater 525 (e.g., a roller in FIG. 5) may be moved across the fabrication bed 530, spreading a fresh layer of material across the fabrication bed 530 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 530 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus or removed from the apparatus after fabrication to continue cooling. Once fully cooled, the object can be separated from the part cake by a variety of methods. The unused material in the part cake may optionally be recycled for use in subsequent fabrication.

In some conventional systems, the process of repeatedly depositing a layer of powder into the build area may rely upon complex closed-loop control systems that include sensors for carefully metering out the amount of powder needed to precisely cover the build area at a constant depth. Some other conventional systems simply provide more powder than is needed and catch the excess in an overflow or catch bin. In the case of closed-loop control, the additive fabrication system requires complex electronics that are capable of operating in a high temperature environment, whereas in the case of catching overflow, the system requires additional space for the overflow bin, and can be wasteful because excess powder is produced.

Figure 6:
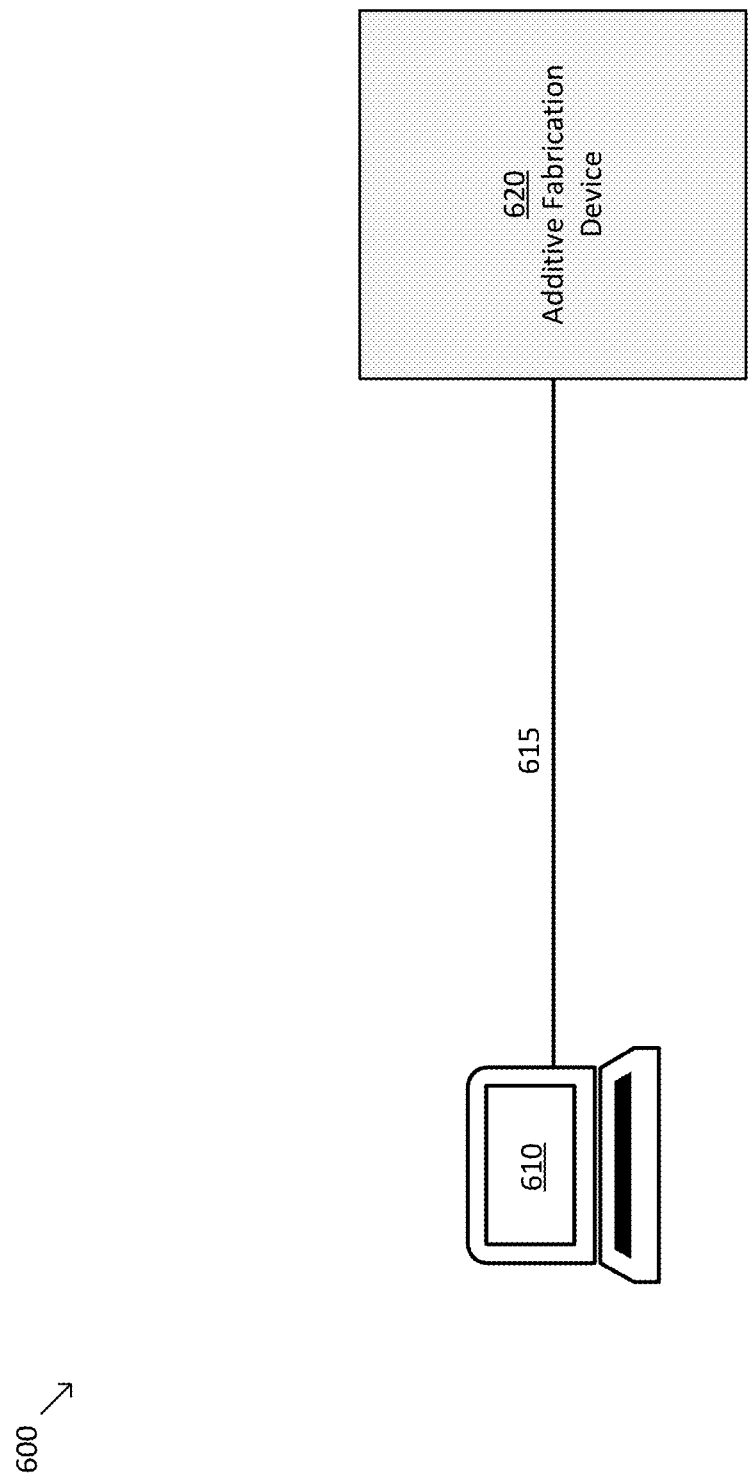
FIG. 6 is a block diagram of a system suitable for practicing aspects of the invention, according to some embodiments.

FIG. 6 is a block diagram of a system suitable for practicing aspects of the invention, according to some embodiments. System 600 illustrates a system suitable for generating instructions to perform additive fabrication by a stereolithography device, a selective laser sintering device, or a fused deposition modeling device, and subsequent operation of the additive fabrication device to fabricate an object. For instance, instructions to fabricate the object using an additive fabrication system may comprise instructions to operate a build platform of an SLA device or a powder deposition mechanism of an SLS device. In some cases, the instructions may also, when executed by the additive fabrication device, cause the additive fabrication device to operate an energy source in concert with the powder deposition mechanism.

According to some embodiments, computer system 610 may execute software that generates two-dimensional layers that may each comprise sections of the object. Instructions may then be generated from this layer data to be provided to an additive fabrication device, such as additive fabrication device 620, that, when executed by the device, fabricates the layers and thereby fabricates the object. Such instructions may be communicated via link 615, which may comprise any suitable wired and/or wireless communications connection. In some embodiments, a single housing holds the computing device 610 and additive fabrication device 620 such that the link 615 is an internal link connecting two modules within the housing of system 600.

Having thus described several aspects of at least one embodiment of this invention, it is to be appreciated that various alterations, modifications, and improvements will readily occur to those skilled in the art.

Such alterations, modifications, and improvements are intended to be part of this disclosure and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of reporting additive fabrication process failures of an additive fabrication device, comprising:
   receiving a print task to produce a 3D model provided by a user;
   in response to completing the print task and thereby producing a printed 3D model, displaying a first graphical user interface to the user, wherein the first graphical user interface includes a first option for indicating an additive fabrication process failure, and a second option for indicating a print success;
   in response to receiving a response corresponding to the first option, displaying a second graphical user interface to the user, wherein the second graphical user interface includes captured images of the printed 3D model or functionalities to capture images of the printed 3D model, and functionalities for providing additive fabrication process failure information; and
   in response to receiving the user providing the additive fabrication process failure information, sending the additive fabrication process failure information to a remote server.

2. The method of claim 1, wherein the first graphical user interface is displayed on a screen of the additive fabrication device, and the second graphical user interface is displayed on a hand-held device.

3. The method of claim 2, comprising, prior to displaying the second graphical user interface:
   displaying a third graphical user interface that includes an optical label; and
   in response to the user scanning the optical label with the hand-held device, displaying the second graphical user interface on the hand-held device.

4. The method of claim 2, wherein the second graphical user interface includes instructions for capturing images and/or video of the print for analysis.

5. The method of claim 3, wherein the optical label includes information about the printed 3D model.

6. The method of claim 2, comprising, prior to displaying the second graphical user interface:
   sending a notification to an application installed on the user's hand-held device; and
   in response to the user opening the application, displaying the second graphical user interface on the hand-held device.

7. The method of claim 2, wherein prior to displaying the second graphical user interface, sending a text, email, or a short code to the user's hand-held device;
   in response to the user opening the text, email, or the short code, displaying the second graphical user interface on the hand-held device.

8. The method of claim 1, wherein the functionalities for providing additive fabrication process failure information includes an annotation function that allows the user to annotate the captured images.

9. The method of claim 8, wherein annotating the captured images includes assigning one or more metadata tags to the captured images to describe types of the additive fabrication process failure.

10. The method of claim 8, wherein annotating the captured images includes assigning one or more metadata tags to locations on the captured images to describe types of the additive fabrication process failure at the locations on the captured images.

11. The method of claim 1, further comprising: alerting customer support service of the additive fabrication device, and/or displaying information of support articles to the user.

12. The method of claim 1, wherein the first graphical user interface and the second graphical user interface are displayed on a hand-held device.

13. The method of claim 1, further comprising a computer vision-based failure detection system for analyzing types of additive fabrication process failures.

14. The method of claim 1, wherein the functionalities for providing additive fabrication process failure information includes a function that allows the user to provide voice memos or other voice-based inputs.

15. An additive fabrication device comprising a computer and a display, the computer configured to:
   receive a print task to produce a 3D model provided by a user;
   in response to completing the print task and thereby producing a printed 3D model, cause to display a first graphical user interface to the user on the display, wherein the first graphical user interface includes a first option for indicating an additive fabrication process failure, and a second option for indicating a print success;
   in response to receiving a response corresponding to the first option, cause to display a second graphical user interface to the user, wherein the second graphical user interface includes captured images of the printed 3D model or functionalities to capture images of the printed 3D model, and functionalities for providing additive fabrication process failure information; and
   in response to receiving the user providing the additive fabrication process failure information, send the additive fabrication process failure information to a remote server.

16. A non-transitory computer readable medium storing instructions that, when executed by at least one processor, cause an additive fabrication device to:
   receive a print task to produce a 3D model provided by a user;

in response to completing the print task, cause to display a first graphical user interface to the user, wherein the first graphical user interface includes a first option for indicating an additive fabrication process failure, and a second option for indicating a print success;

in response to receiving a response corresponding to the first option, cause to display a second graphical user interface to the user, wherein the second graphical user interface includes captured images of the printed 3D model or functionalities to capture images of the printed 3D model, and functionalities for providing additive fabrication process failure information; and in response to receiving the user providing the additive fabrication process failure information, send the additive fabrication process failure information to a remote server.

\* \* \* \* \*